(12) United States Patent
Eberle

(10) Patent No.: US 6,425,478 B1
(45) Date of Patent: Jul. 30, 2002

(54) CONVEYOR DEVICE AND CORRESPONDING TRANSPORT MEANS

(75) Inventor: Jürg Eberle, Hinwil (CH)

(73) Assignee: Ferag AG, Hinwil (CH)

( * ) Notice: Subject to any disclaimer, the term of this patent is extended or adjusted under 35 U.S.C. 154(b) by 0 days.

(21) Appl. No.: 09/554,539

(22) PCT Filed: Dec. 9, 1998

(86) PCT No.: PCT/CH98/00525
§ 371 (c)(1),
(2), (4) Date: May 12, 2000

(87) PCT Pub. No.: WO99/33722
PCT Pub. Date: Jul. 8, 1999

(30) Foreign Application Priority Data

Dec. 23, 1997 (CH) .............................. 2964/97

(51) Int. Cl.[7] ............................... B65G 35/08
(52) U.S. Cl. ..................................... 198/795
(58) Field of Search ........................... 198/795, 867.13

(56) References Cited

U.S. PATENT DOCUMENTS

| | | | |
|---|---|---|---|
| 2,534,186 A | * 12/1950 | Urban | ......................... 198/795 |
| 3,618,838 A | 11/1971 | Webster et al. | |
| 3,848,726 A | 11/1974 | Wiemer | |
| 4,892,186 A | * 1/1990 | Frei | ...................... 198/867.13 |
| 5,261,520 A | 11/1993 | Duke | ......................... 198/375 |
| 5,529,168 A | * 6/1996 | Soriano et al. | ......... 198/795 X |
| 5,590,756 A | * 1/1997 | Zaguroli, Jr. | ............... 198/795 |

FOREIGN PATENT DOCUMENTS

| | | | |
|---|---|---|---|
| CA | 466951 | * 8/1950 | ................. 198/795 |
| DE | 1 273 415 | 7/1968 | |
| DE | 2453274 | * 5/1976 | ................. 198/795 |

OTHER PUBLICATIONS

European Search Report and Annex for Swiss Application No. CH 2964/97, Dec. 23, 1997.

* cited by examiner

Primary Examiner—James R. Bidwell
(74) Attorney, Agent, or Firm—Brinks Hofer Gilson & Lione

(57) ABSTRACT

The invention relates to a conveyor device (1) comprising a plurality of individually movable transport means (2) which can be driven adjacent to one another by the front sides (2b, 2c) thereof, and which are guided by means of a guiding rail (4). The inventive device also has a driving means (3) which actuates the transport means (2) in a curved section (6f) of the guiding rail (4), whereby the driving means (3) and the transport means (2), said transport means being successively conveyed in a contactless manner, positively interact with one another in order to convey transport means (2) in a curved section (6f).

9 Claims, 5 Drawing Sheets

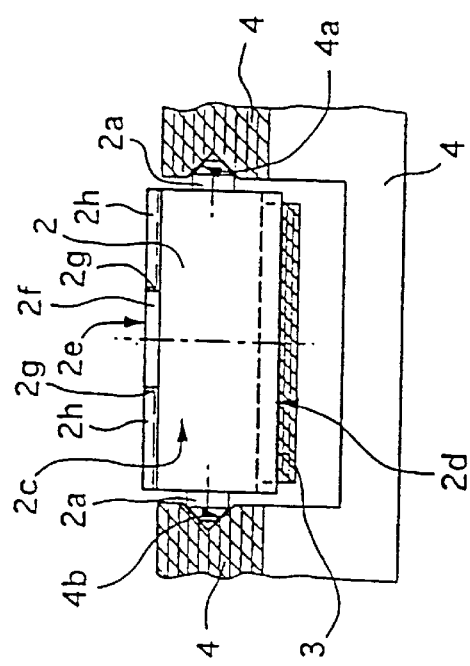
Fig. 6 (A-A)
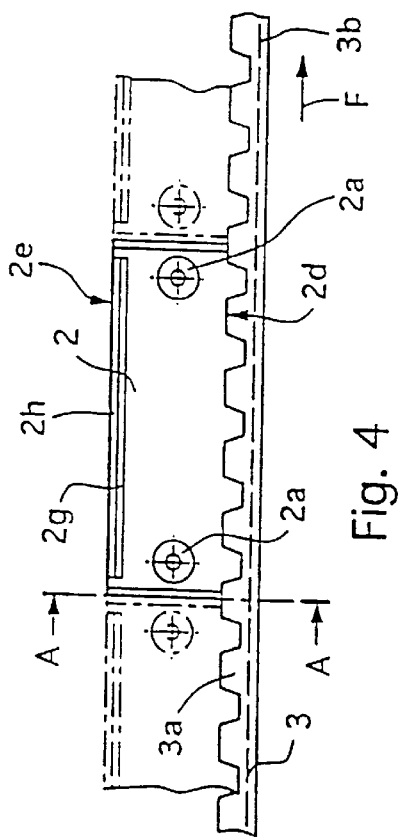
Fig. 4
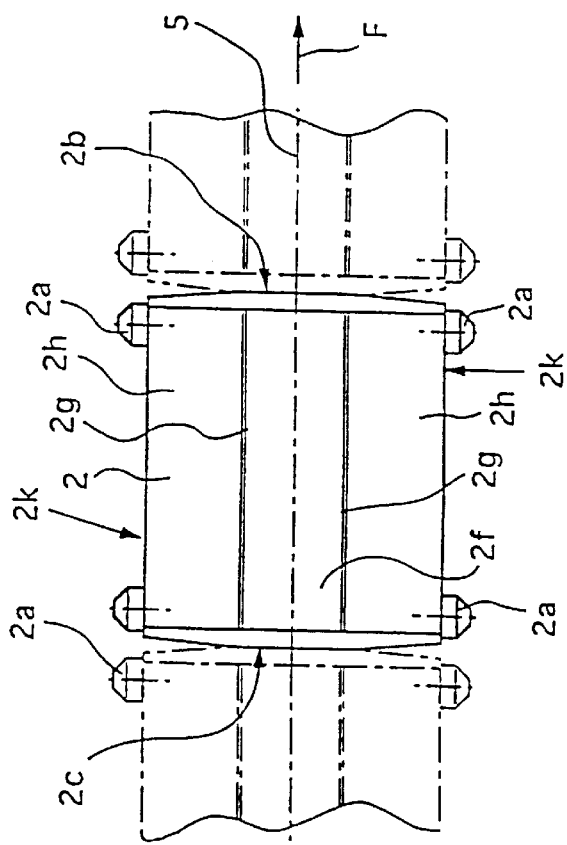
Fig. 5

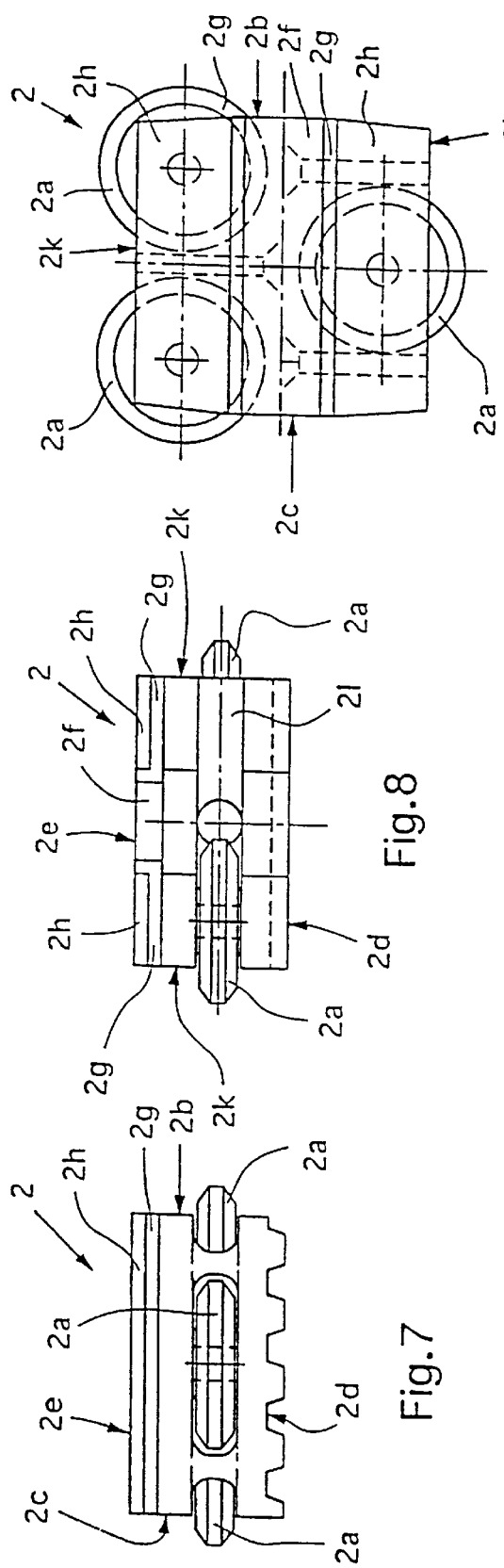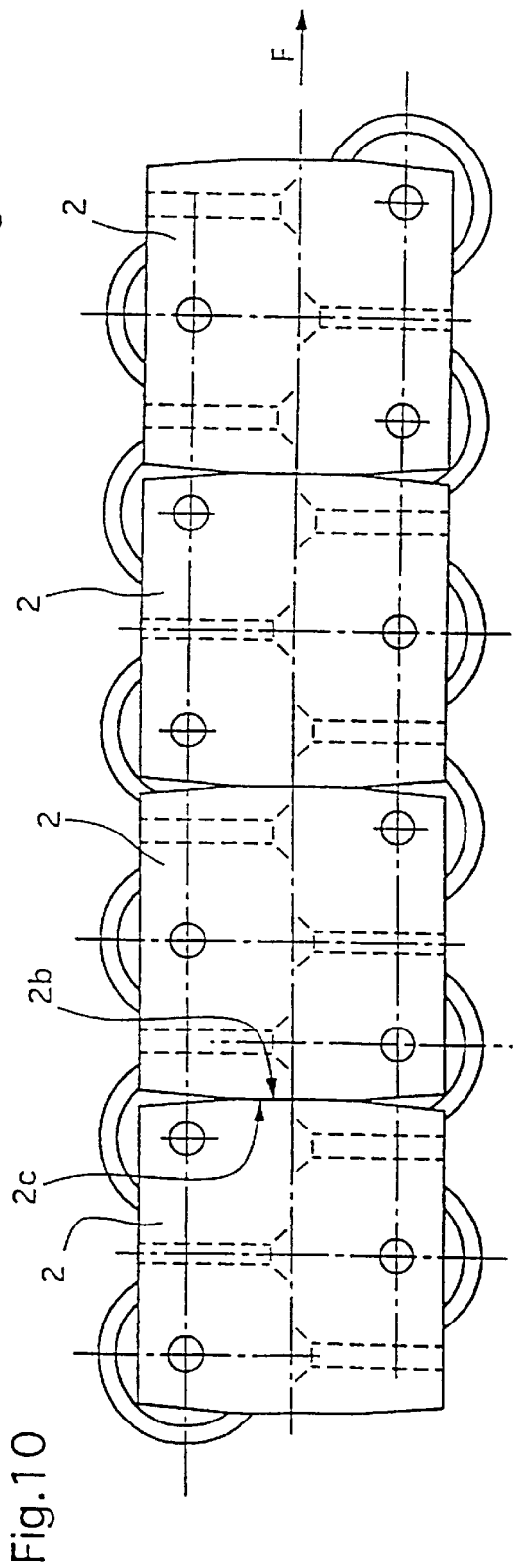

CONVEYOR DEVICE AND CORRESPONDING TRANSPORT MEANS

The invention relates to a conveying apparatus according to the preamble of claim 1. The invention also relates to a transporting means according to the preamble of claim 6, said transporting means being configured in accordance with the conveying arrangement.

EP 0 592 918 discloses a conveying arrangement with a strand of links which are driven in a state in which they butt against one another via end surfaces and are secured by means of guide rails. Such a row of links can be conveyed, in particular, on a rectilinear guide rail by means of the pushing forces acting thereon.

The disadvantage with this known apparatus is the fact that the links, which are pushed in a curved section of the guide rail, produce a force which acts in the radial direction in relation to the guide rail, resulting in considerable force losses by friction and necessitateing a guide-rail design which can be correspondingly subjected to loading. In addition, the links and also the guide rails experience increased wear. The known conveying apparatus is thus suitable for preferably rectilinear pushing operation.

U.S. Pat. No. 3,618,838 discloses a further conveying apparatus comprising a multiplicity of transporting means which can be moved individually, can be driven in a state in which they butt against one another via end sides, and are guided by means of a guide rail, a drive means which acts on the transporting means being provided in curved section of the guide rail.

The disadvantage with this known apparatus is the fact that the transporting means are subjected to a radially outwardly acting force in the curved section of the guide rail, and this causes increased frictional forces and increased wear. In addition, the situation where successive transporting means are in contact with one another in the curved section in not ruled out, and this causes additional wear.

An object of the present invention is to develop an apparatus of the type mentioned in the introduction so as to provide a conveying apparatus which has transporting means conveyed by pushing forces, can negotiate rectilinear paths and paths of any desired curvature and has low wear.

This object is achieved by a conveying apparatus having the features of claim 1. Subclaims 2, 3, 4 and 5 relate to further advantageous configurations of the conveying apparatus. The object is also achieved by a transporting means which is configured in adaptation to the conveying apparatus and has the features of claim 6. Subclaims 7 to 9 relate to further advantageously configured transporting means. The object is also achieved by a method of conveying rail-guided transporting means.

The object is achieved, in particular, by a conveying apparatus having a multiplicity of transporting means which can be moved individually, can be driven in a state in which they butt against one another via end sides, and are guided by means of a guide rail, and also comprising a drive means which acts on the transporting means in a curved section of the guide rail, it being the case that the drive means and the transporting means interact in a form-fitting manner in order to convey successive transporting means in the curved section in a position in which they do not come into contact with one another.

In a preferred embodiment, the transporting means are secured on the guide rail.

One advantage of the conveying apparatus according to the invention is that, within a curved section of the guide rail, the transporting means, which are otherwise conveyed in a state in which they butt against one another and are subjected to pressure, are retained and conveyed without coming into contact with one another, with the result that there is no force occurring which acts in the radial direction as a result of the transporting means being in contact with one another. In addition, the drive means, engaging in the transporting means in a form-fitting manner, causes a force which acts essentially in the conveying direction of the transporting means. The force components which cause friction and/or wear in the curved section are thus very small, for which reason it is also possible for the transporting means to be conveyed in the curved section by low forces in the conveying direction.

The drive means, which acts on the transporting means in the curved rail section, is suitable, in particular, for section within which the transporting means undergoes a relatively large change in direction of, for example, 90 degrees or 180 degrees. In the case of a small change in direction of a few degrees, for example of 10 degrees, it is also possible to dispense with the driving means, with the result that the transporting means pass through a guide-rail section which is curved in this way as bodies which subject one another to pressure.

The conveying apparatus according to the invention makes it possible for transporting means which can be subjected to pressure and are driven in a state in which they butt against one another via end sides to be conveyed along a guide rail in the horizontal, vertical or any three-dimensional direction. In addition, it is possible to convey any desired length of row of abutting, rail-guided transporting means which are subjected to pressure, since the row is relieved of loading at each guide-rail curved section which has a drive means. The drive means can be driven actively by a motor. In the rectilinear direction, the row of abutting transporting means forms a type of bar which can be subjected to pressure. The conveying apparatus according to the invention makes it possible to form, so to speak, the "curved bar" in the row of abutting transporting means form a type of bar in each case in which rectilinear rail sections, and, in curved rail sections, the transporting means are well retained and conveyed without coming into contact with one another, the pushing forces nevertheless being transmitted, by the conveying apparatus according to the invention, to the abutting transporting means which are arranged in each case in the rail section following the curved rail section.

The drive means may be designed, for example as a toothed belt or a gearwheel with outwardly projecting teeth.

The transporting means are configured as rail-guided rolling or sliding bodies, and the size of the transporting means and/or of the rail is to be configured in adaptation to the object which is to be conveyed. It is possible for the transporting means, for the purpose of conveying relatively small loads, for example printed products, to be of correspondingly small configuration or, for the purpose of conveying relatively heavy loads, for example bottles or pieces of luggage, to be of correspondingly large configuration.

Particularly preferred embodiments and uses of the conveying apparatus according to the invention, and of the corresponding transporting means, are disclosed in CH Patent Applications Nos. 1997 2962/97, 1997 2963/97, 1997 2965/97 (Representative's references A12204CH, A12205CH, A12207CH) by the same applicant, said applications being filed on the same day and having the titles "Schienenführbares Fördermittel und Führungsschiene zum Führen des Fördermittels" [Rail-guidable conveying means and guide rail for guiding the conveying means] "Fördersystem" [Conveying system] and "Fördereinrichtung" [Conveying apparatus].

The invention is explained herein below, by way of exemplary embodiments, with reference to the drawings. In the figures:

FIG. 4 shows a longitudinal view of a transporting means;

FIG. 5 shows a plan view of the transporting means according to FIG. 4;

FIG. 6 shows a view of the end side of the transporting means along line A—A according to FIG. 4;

FIG. 7 shows a longitudinal view of a further transporting means;

FIG. 8 shows a view of the end side of the further transporting means;

FIG. 9 shows a plan of the further transporting means;

FIG. 10 shows a plurality of further transporting means butting against one another;

Figure 1:
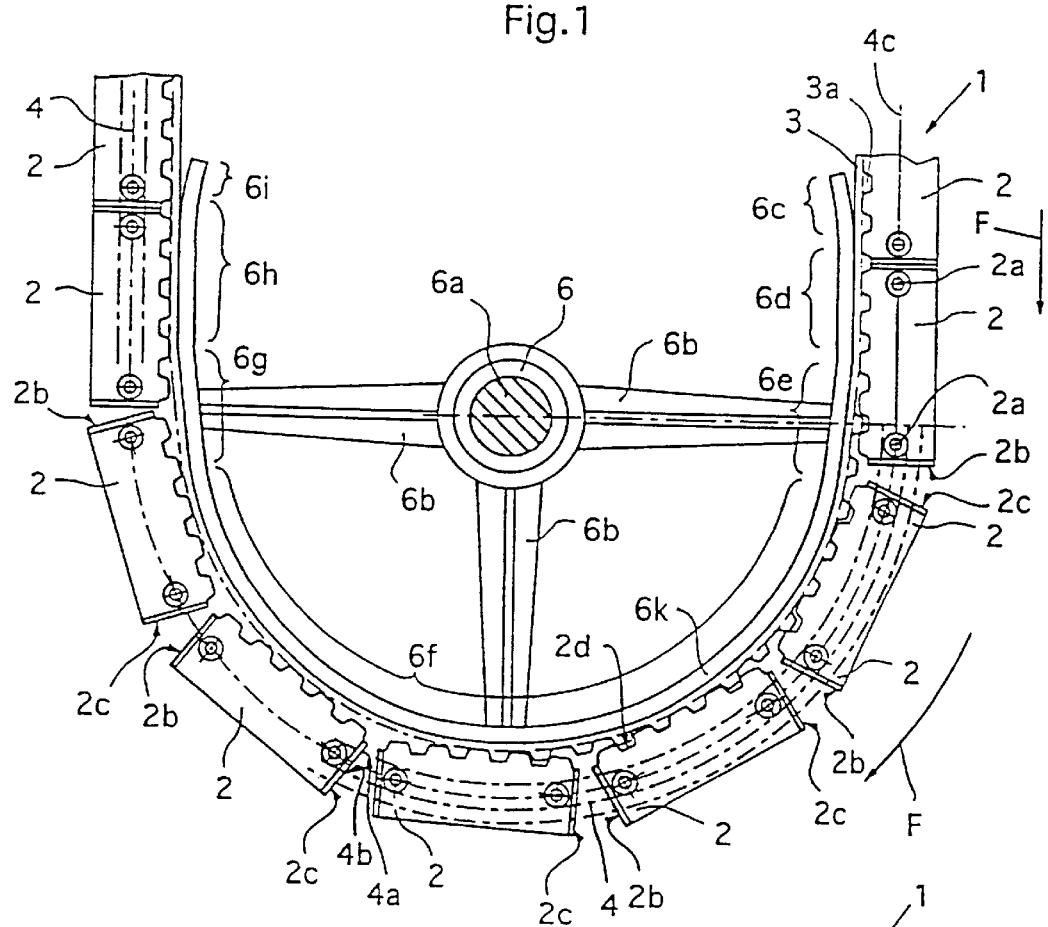
FIG. 1 shows a conveying apparatus with a deflecting location.

FIG. 1 shows a conveying apparatus 1 with a plurality of transporting means 2 which are secured by means of a guide rail 4 and are guided such that they can be moved in a conveying direction F. The guide rail 4, of which the course is illustrated symbolically by the center line 4c, has a groove which is configured in the form of a v by two side walls 4a, 4b and in which the transporting means 2, configured as carriages, are secured by laterally projecting guide means 2a, configured as sliding bodies, and are mounted such that they can be moved in a conveying direction F of the guide rail 4. The guide rail 4 which is arranged on the right-hand side in FIG. 1, runs rectilinearly in an inlet region 11a and has a center line 4c opens out tangentially into a semicircular arc, it being the case that following a deflection through 180°, running tangentially again, the guide rail 4 forms a rectilinear outlet region 11b. Both in the inlet region 11a and in the outlet region 11b, the transporting means 2 are in contact with one another via abutting end sides 2b, 2c. Each transporting means 2 has an engagement side 2d in which the force-transmission means 3 or the drive means 3 engages in a form-fitting manner, it being the case that, in the exemplary embodiment illustrated, the drive means 3 is configured as a toothed belt with teeth 3a and a core 3b and the engagement side 2d of the transporting means 2 is configured in adaptation to the form-fitting engagement of the toothed belt. A deflecting section 6 with bearing location 6a and supports 6b retains a sheetlike supporting element 6k for the toothed belt 3, the shaping of the supporting element 6k determining the running direction of the elastic toothed belt. In the inlet region 11a illustrated and in the outlet region 11b illustrated, the toothed belt 3 is already in engagement with the transporting means 2. The engagement of the toothed belt 3 in the transporting means 2 is explained in detail with reference to FIG. 1. The toothed belt 3, which runs between the guide rail 4 and the supporting element 6k, undergoes deflection through 180° at least in the curved section 6f, it being the case that the core 3b does not undergo any change in direction, but the distance between the teeth 3a increases slightly in the conveying direction S, with the result that, in the curved section 6f the transporting means 2 are conveyed in the conveying direction F and retained in a form-fitting manner by the teeth 3a of the drive means 3 without coming into contact with one another. The supporting element 6k has an inlet section 6c, an adjoining section region 6d, which runs rectilinearly and parallel to the guide rail 4, and opens out into a yielding-back supporting section 6e, within which the radial distance, in relation to the bearing location 6a, between the guide rail 4 and the surface of the supporting element 6k is increased. The yielding-back supporting section 6e is followed by the section 6f which runs in the form of an arc of a circle and opens out into a closely fitting supporting section 6g, within which the distance between the surface of the supporting element 6k and the guide rail 4 is reduced. Thereafter, the supporting element 6k opens out into a supporting section 6h, which runs rectilinearly and parallel to the guide rail 4 and opens out into an outlet section 6i.

In the inlet and in the outlet regions 11a, 11b, the guide rail 4 advantageously has a guide rail 4 which opens out tangentially into the curved section 6f. In order to compensate for the arc height of the transporting means 2 which is effective in the curved section 6f, the toothed belt 3 is set back in the direction of the bearing location 6a in the yielding-back section 6e. It can be seen from the exemplary embodiment illustrated that the yielding-back section 6e, 6g is located in front of the bearing location 6a and begins above the bearing location 6a, the position where the yielding-back section 6e, 6g begins being dependent on the length of the transporting means 2.

In order to compensate for the arc height of the transporting means 2, it would also be possible to dispense with the yielding-back supporting section 6e of the toothed belt 3 and to compensate for the arc height by the guide rail 4 having, in the inlet region, a short section in which the rail is curved convexly outward.

The exemplary embodiment illustrated in FIG. 1 has the advantage that the transporting means 2 conveyed in the rectilinear section of the guide rail 4 do not undergo any relative movement between the abutting end sides 2b, 2c, and that, during passage into the curved section 6f, the transporting means 2 are spaced apart from one another, and possibly relieved of pressure, relative movements between the end surfaces 2b, 2c being avoided in the process. Following passage through the curved section 6f, the end sides 2b, 2c of successive transporting means 2 are brought into contact with one another, with the avoidance of relative movement between them or with only a relatively slight amount of relative movement between them, and are then possibly subjected to pressure again. The conveying apparatus 1 according to the invention thus has merely low friction and low wear as far as the transporting means 2 are concerned.

Figure 2:
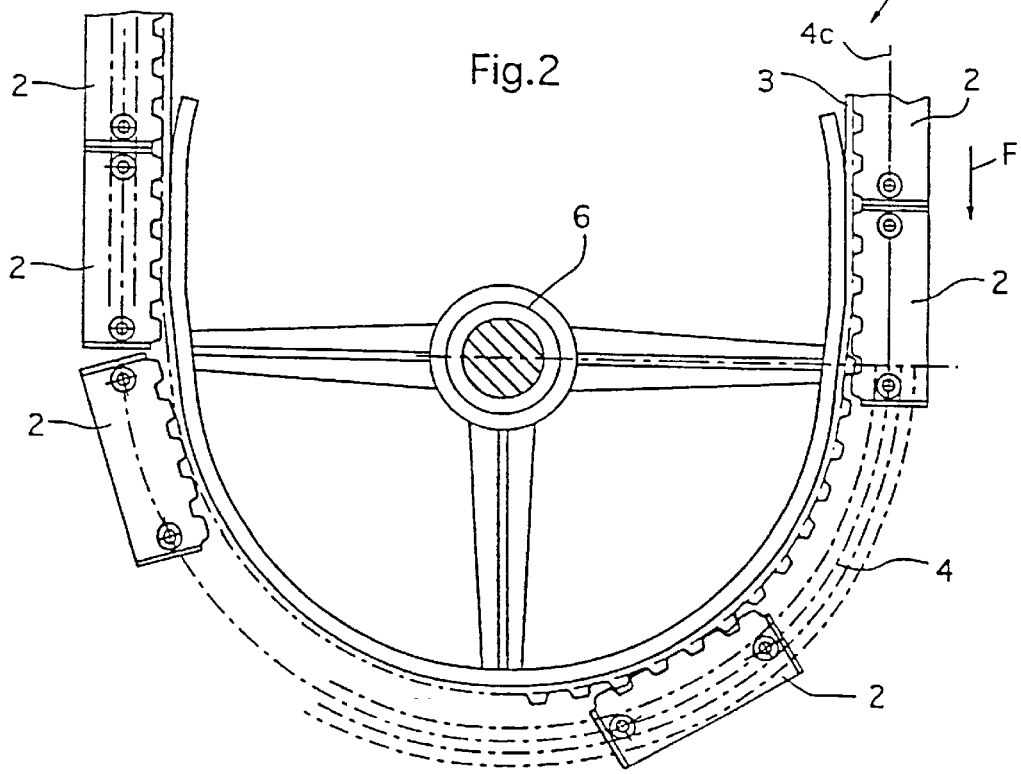
FIG. 2 shows the conveying apparatus according to FIG. 1 with a reduced number of transporting means.

FIG. 2 shows the same conveying apparatus 1 according to FIG. 1, although only two transporting means are located in the curved section 6f, one transporting means 2 being spaced apart by relatively large distances from the preceding transporting means 2 and from the following transporting means 2. This transporting means 2 is also guided reliably through the curved section 6f since the transporting means 2 is in form-fitting engagement with the drive means 3 and is thus conveyed without coming into contact with other transporting means and in a precisely defined position in relation to the same. As long as the drive means 3 is in engagement with the transporting means 2, the position of the transporting means 2 remains defined and secured.

Figure 3:
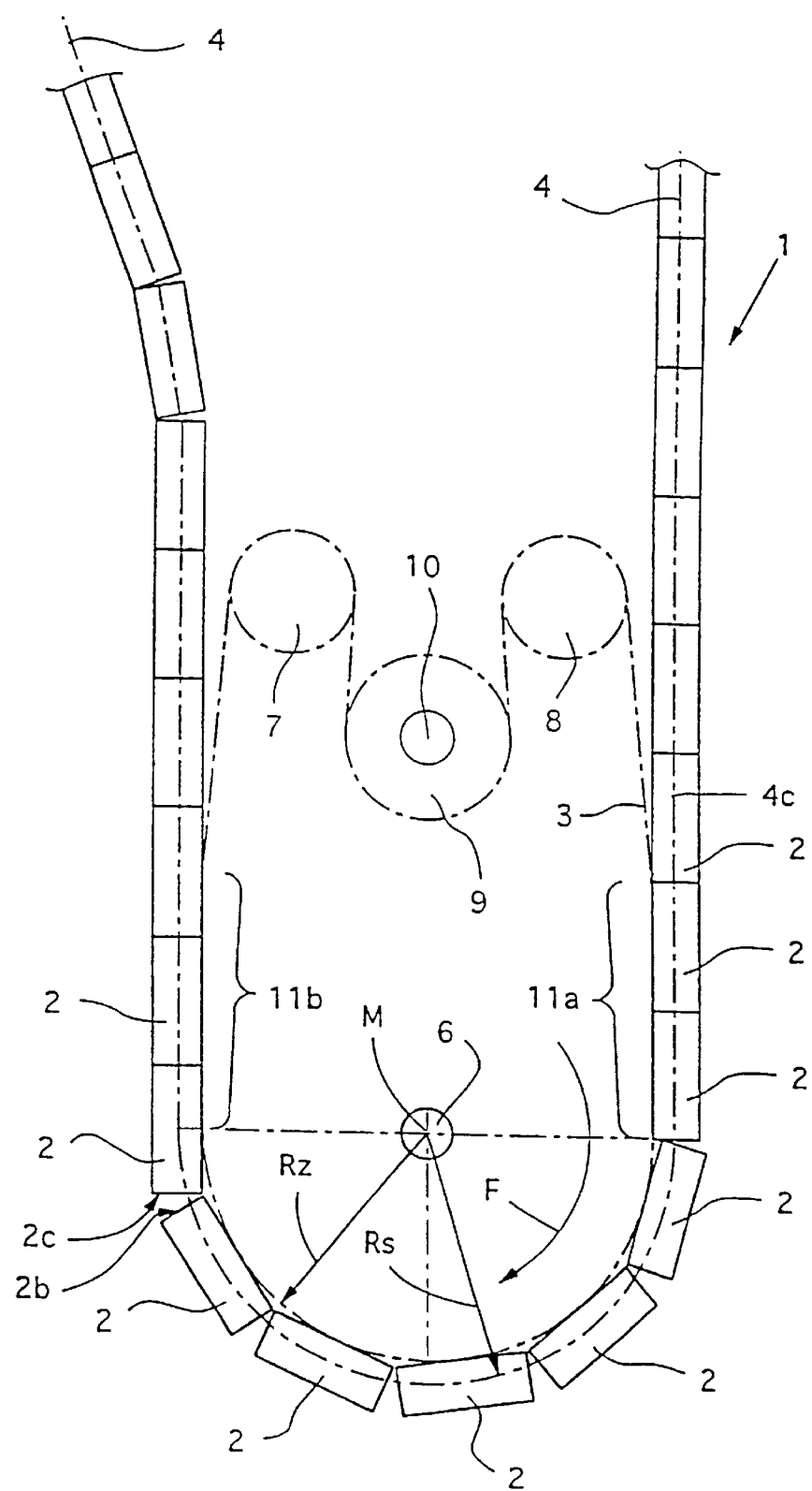
FIG. 3 shows a schematic view of a conveying apparatus.

FIG. 3 shows a schematic view of a conveying apparatus 1 with transporting means 2, a drive means 3, configured as a toothed belt, and a guide rail 4 with center line 4c. This conveying apparatus 1 could run both in the vertical direction and in the horizontal direction or in any other desired direction. The rest of its functioning will be explained by way of a vertical arrangement. In the lowermost section, the guide rail 4 undergoes deflection through 180°, the deflecting means 6 forming a common center point of curvature M of the guide rail 4 and of the drive means 3, and the guide rail 4 having a radius RS [sic] and the drive means 3 having a radius RZ [sic] which is smaller than the radius RS [sic]. The toothed belt 3 is guided via a supporting element 6k (not illustrated) during a deflection through 180°, and then runs around a deflecting roller 7, a deflecting roller 9, which is driven actively by a motor drive device 10, and around a deflecting roller 8, in order then to be refed to the supporting element k (not illustrated). Within the inlet region 11a, the toothed belt advances, by way of teeth 3a aligned in the direction of the transporting means 2, toward the engagement side 2d at the acutest angle possible, i.e. as far as possible tangentially to the guide rail 4, in order that the teeth 3a engage in the engagement side 2d of the transporting means 2 in a form-fitting manner, relative movement being avoided in the process. It is likewise the case that, in an outlet region 11b, the toothed belt 3, following passage through the curved section 6f, is guided as far as possible tangentially, or at a very acute angle, to the guide rail 4, in order to release the engagement of the tooth 3a from the engagement side 2a with relative movement being avoided as far as possible. In the exemplary embodiment illustrated, the drive means 3 runs parallel to the guide rail 4 in the inlet and outlet regions 11a and 11b, and only moves away in the direction of the deflecting roller 7, 8 at an acute angle following the inlet and outlet regions 11a, 11b. The conveying apparatus 1 does not necessarily require an active drive 10. Without an active drive 10, the toothed belt 3 would [lacuna] driven by the transporting means 2, which run vertically on the inlet side and produce a downwardly acting force, with the result that the individual transporting means 2, although having a vertically running compressive force in each case on their end sides 2b, 2c in the inlet region 11a, are moved by the drive means 3, guided by the guide rail 4, in the curved section 6f without coming into contact with one another and in a state in which they are relieved of pressure. At the end of the curved section 6f, the end sides 2b, 2c of the transporting means 2 pass into operative connection with one another again, with the result that the end sides 2b, 2c are subjected to a vertically running compressive force by the upwardly conveyed transporting means 2.

Assuming that the conveying apparatus 1 according to FIG. 3 is arranged with guide rails 4 running essentially in the vertical direction, the forces act on the transporting means 2 as follows: on the right-hand guide rail 4, in particular in the inlet region 11a, the forces caused by the transporting means 2 act in the downward direction. There is no contact between the transporting means 2 arranged in the curved section 6s, with the result that the transporting means 2 do not transmit any forces between them. On the left-hand guide rail 4, in particular in the outlet region 11b, the forces caused by the transporting means 2 likewise act in the downward direction, it being necessary for the transporting means 2 which are in engagement with the force-transmission means 3 on the left to produce an upwardly directed pushing force, in order for the transporting means 2 to be conveyed upward. The transporting means 2 can be conveyed by the force-transmission means 3 without an additional drive being necessary. The force exerted in the downward direction by transporting means 2 on the right is absorbed by the force-transmission means 3, as a result of which the force-transmission means 3 is moved on one side, which allows the transporting means 2 to be conveyed in the curved section 6f. In addition, the force-transmission means 3 in the left-hand region subjects the transporting means 2 to the upwardly acting pushing force. Such a force transmission brought about merely by passive means is possible if the force which acts in the downward direction on the right is larger than the upwardly acting pushing force which is necessary in the left-hand region.

One advantage of the conveying apparatus according to the invention is that the arrangement according to the invention of the guide rail 4 and drive means 3 ensures that the transporting means 2 are conveyed in any desired running direction of the guide rail 4, in particular in the horizontal or vertical direction, and that, in the curved section 6f, the transporting means 2 are conveyed and deflected with end sides 2b, 2c spaced apart from one another.

FIG. 4 shows a longitudinal view of a transporting means 2, FIG. 5 shows a plan view of the transporting means 2 according to FIG. 4 and FIG. 6 shows a view of the end side of the transporting means 2 along line A—A according to FIG. 4. The transporting means 2 has a cuboidal basic body having two end sides 2b, 2c which are arranged opposite one another and have a convex surface. The basic body also has an engagement side 2d, which is configured in adaptation to the engagement of the toothed belt 3 with teeth 3a, and a load side 2e which is arranged opposite said engagement side and is intended for conveying an article. Furthermore, on the two remaining sides, the basic body has two guide sides 2k which are arranged opposite one another and have guide means 2a which project perpendicularly to the conveying direction F, run in a common plane and are configured as sliding bodies which engage in the V-shaped groove 4a, 4b of the guide rail 4. The guide means 2a and the v-shaped groove 4a, 4b could also be arranged the other way around such that the two guide sides 2k each have a v-shaped groove 4a, 4b running over the entire side surface in the conveying direction F and the guide rail 4 has guide means 2a which run perpendicularly to the conveying direction F, project in the direction of the base body, run in a common plane and, configured as a sliding guide, are fixed to the guide rail 4. Said guide means 2a of the guide rail 4 engage in the v-shaped groove 4a, 4b of the transporting means 2.

The transporting means 2 is guided reliably by the guide rail 4 by way of the four guide means 2a. Objects of a wide range of different configurations may be conveyed and retained, by retaining means of a wide range of different configurations, on the load side 2e. It is possible, for example, for a gripper for a printed product to be arranged on the load side. However, it would also be possible for a carrying surface, for, for example, a piece of luggage to be arranged thereon. The conveying apparatus 1 could also be configured as a belt conveyor or a discontinuous belt conveyor. It would likewise be possible for the carrying surface to be provided with a brush, with bristles, with a bur-type fastener or with hooks. The transporting means 2 could also be a slip drive.

The guide means 2a are preferably arranged on the transporting means 2 such that the transporting means 2 is guided by the guide rail 4 in a tilting-free manner, with the result that all the forces acting thereon as well as torques are transmitted to the guide rail 4, with the result that the drive means 3 is subjected predominantly to forces which are necessary, or occur, for the purpose of conveying in a conveying direction F.

In the exemplary embodiment illustrated, the transporting means 2, as can be seen, in particular, from FIG. 6, has two L-shaped ferromagnetic, metal parts 2g. These ferromagnetic parts 2g lead from the guide side 2k, covered by a side part 2h, in the direction of the center of the transporting means 2, the parts 2g being deflected in the form of an L on a central part 2f and extending in the direction of the surface of the load side 2e. This advantageous configuration allows an electromagnetic field to be applied on both sides of the guide side 2k and, by virtue of the magnetic flux being conducted via the ferromagnetic parts 2g, a ferromagnetic object resting on the load side 2a to be retained.

FIG. 7 shows a lengthwise view of a further transporting means 2, FIG. 8 shows an end view of the same transporting means 2 and FIG. 9 shows a plan view of the same transporting means 2. This transporting means 2 has guide means 2a which are configured as wheels. The centers of rotation of the three wheels 2a form an isosceles triangle. The basic body, which is once again cuboidal, having two end sides 2b, 2c which are arranged opposite one another, having an engagement side 2d, having a load side 2e and having two guide sides 2k arranged opposite one another has recesses in the basic body which are intended for receiving the wheels 2a. The wheels 2a project beyond the guide side 2k and, on that guide side 2k in which two wheels are spaced apart in the conveying direction F, also project beyond the end sides 2b, 2c. It can be seen from the side view according to FIG. 8 that provided in the basic body is a recess 21 which is intended for the purpose of receiving that wheel 2a of an adjacent transporting means 2 which projects beyond the end side 2b, 2c. FIG. 10 illustrates a row of transporting means 2 which butt alongside one another in the conveying direction F, in each case two adjacent transporting means 2 having been rotated through 180° in relation to one another in each case about the axis formed by the conveying direction F, with the result that the wheel 2a projecting in each case beyond the end side 2b, 2c of one transporting means 2 comes to rest in the recess 21 of the adjacent transporting means 2. This makes possible a row of transporting means 2 which are conveyed by acting compressive forces via the end sides 2b, 2c, which are in contact with one another. The transporting means 2 illustrated, with three guide means 2a configured as wheels, runs very well in the guide rail 4. It is also possible, on account of the relatively large distance between the individual wheels 2a, for torques acting via the load side 2e to be transmitted reliably to the guide rail 4 without causing the transporting means 2 to cant. The convexly running end sides 2b, 2c, rather than allowing the transporting means 2 to be conveyed merely in a rectilinear manner in the conveying direction F, also allow slightly curved paths, the curvature of said curved path running about an axis located perpendicularly to the viewing direction. In the conveying apparatus 1 according to FIG. 1, the transporting means 2 are deflected about an axis running perpendicularly to the conveying direction F and parallel to the viewing plane. In order to avoid contact between the transporting means 2 in the curved section 6f, the carriages are configured so as to be correspondingly short in the conveying direction F. With a relatively short overall length in the conveying direction F, the transporting means 2 have a relatively large wheel-to-wheel distance. One advantage of the short overall length of the transporting means 2 in the conveying direction F is that, during passage through curves, the central wheel 2a of the transporting means 2, as seen in the conveying direction F, undergoes a slight yielding deflection in relation to the two outer wheels 2a of the transporting means 2, since the distance between the chord defined by the two outer wheels 2a and the height of the arc followed by the central wheel 2a is small in the case of a short transporting means 2.

The transporting means 2 are advantageously designed such that the distance of the center line 4c of the guide rail 4, on which the guide means 2a also move, are a relative small distance from the core (3b) of the drive means 3, configured, for example, as a toothed belt.

The transporting means 2 is always illustrated as an inner runner in relation to the guide rail 4. Of course, it would also be possible for the transporting means 2 to be configured as an outer runner and the guide rail 4 is arranged on the inside and at least partially enclosed by the outer transporting means 2.

The transporting means 2 which are configured in adaptation to the conveying apparatus 1 may be configured in a wide range of different ways, for example as rolling bodies, as are disclosed in EP 0 387 318 A1.

Figure 11:
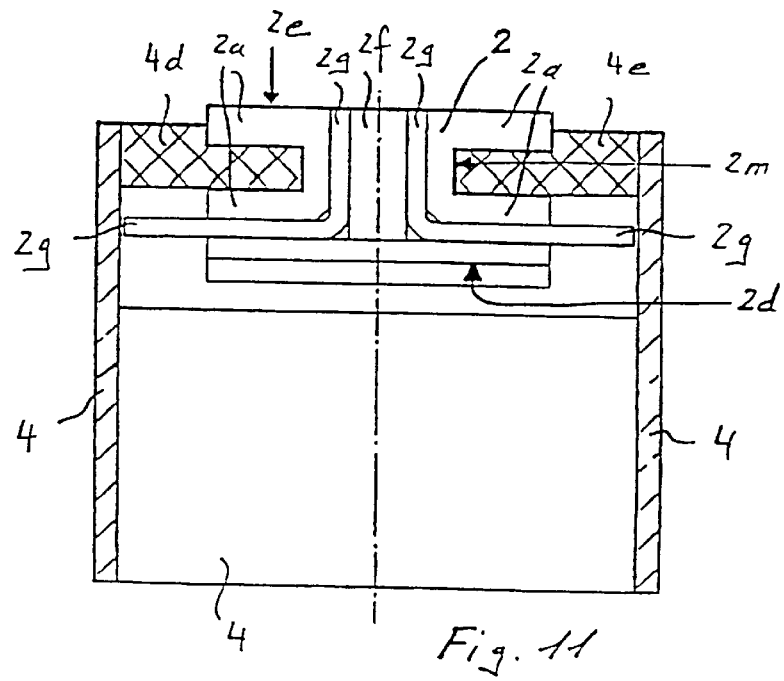
FIG. 11 shows a view of the end side of a further transporting means and a section through the guide rail thereof.
Figure 12:
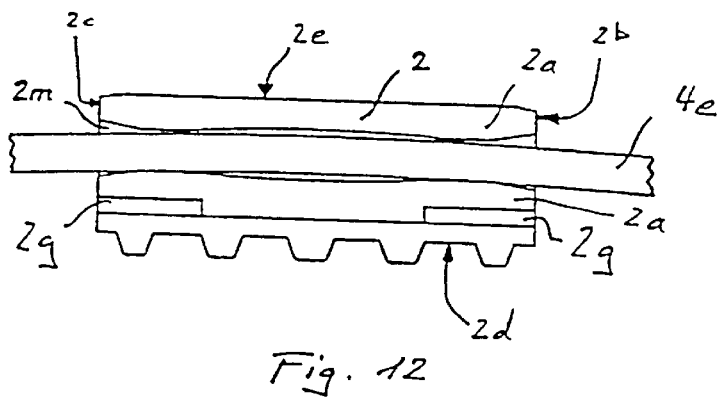
FIG. 12, 13 show a side view of two further transporting means.
Figure 13:
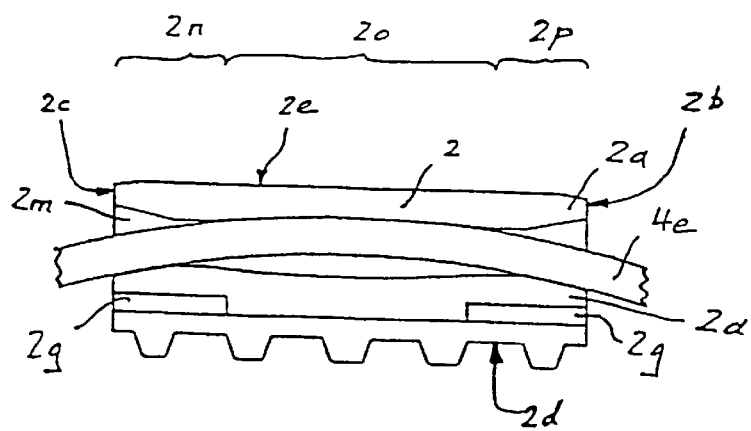

FIG. 11 shows a view of the end side of a further exemplary embodiment of a transporting means 2 and a section through a guide rail 4. In contrast to the embodiment illustrated in FIGS. 4, 5 and 6, the rail 4 has two projecting part-rails 4d, 4e, the transporting means 2 having, on each side, in each case two guide means 2a which can rest on the respective part-rail 4d, 4e at the top and bottom. The transporting means 2 comprises a load side 2e, an engagement side 2d, a ferromagnetic part 2g and a central part 2f. FIGS. 12 and 13 show a side view of two transporting means 2 which are suitable for sliding in the guide rail 4 illustrated in FIG. 11. The side view shows the transporting means 2 with engagement side 2d, load side 2e, ferromagnetic part 2g and end sides 2b, 2c. The part-rail 4e is arranged in the groove 2m, which is formed by the guide means 2a. The groove 2m could have the same width over the entire length of the transporting means 2. In order to improve the sliding properties in curved rail sections, the groove 2m in the exemplary embodiment according to FIG. 13 has a first section 2n, 2p, with a groove width which tapers respectively to the right and left, and a central section 2o with a groove width running in the form of a segment of a circle. As can be seen from FIGS. 12 and 13, this configuration of the groove 2m guides the transporting means reliably as it passes through rail sections of the rail sections of different curvature.

What is claimed is:

1. Conveying apparatus comprising a multiplicity of transporting means which can be moved individually, can be driven in a state in which they butt against one another via end sides, and are guided by means of a guide rail, and also comprising a drive means which acts on the transporting means at least in a curved section of the guide rail, wherein the drive means and the transporting means interact in a form-fitting manner in order to convey successive transporting means in the curved section in a position in which they do not come into contact with one another, wherein the drive means has projecting teeth and the transporting means have an engagement side which is configured in adaptation to the form-fitting engagement of the drive means, and wherein, in the curved section, the projecting teeth and the engagement side of the transporting means are arranged opposite one another and are partially in form-fitting engagement, wherein the teeth are arranged on the inside, and the transporting means are arranged on the outside, in relation to the curved section, and wherein the curved section of the guide rail has a center point of curvature M and a constant radius RS, wherein at least over part of the length of the curved section, the teeth of the drive means are moved along a curved path with the same center point of curvature M and a radius RZ which is smaller than the radium RS of the guide rail.

2. Conveying apparatus according to claim 1, characterized in that drive means is arranged in relation to the guide rail such that the transporting means is subjected to a force acting essentially in the conveying direction F of the guide rail.

3. Conveying apparatus according to claim 1, characterized in that the drive means, is configured as a toothed belt which is fed to the guide rail upstream of the curved section, and led away from the curved section downstream of the curved section, at a very acute angle in relation to the guide rail, in order to allow the teeth and the engagement side to engage with one another, and be released from one another, as far as possible tangentially.

4. Conveying apparatus according to claim 1 or 2, characterized in that the drive means is driven actively by a motor drive device.

5. Conveying apparatus according to claim 1 or 2, characterized in that the drive means is designed as a toothed belt, and there is in the region of the curved section a supporting element which determines the curved path of the toothed belt and on which the toothed belt rests.

6. Transporting means for use in a conveying apparatus of the type comprising a multiplicity of transporting means which can be moved individually, can be driven in a state in which they butt against one another via end sides, and are guided by means of a guide rail, and also comprising a drive means which acts on the transporting means at least in a curved section of the guide rail, wherein the drive means and the transporting means interact in a form-fitting manner in order to convey successive transporting means in the curved section in a position in which they do not come into contact with one another, wherein said transporting means has a cuboidal basic body having two end sides arranged opposite one another, having an engagement side provided for a drive means to act thereon, and having a load side which is located opposite said engagement side and is intended for conveying an object, and having two guide sides which are arranged opposite one another and have projecting guide means, at least three of said guide means being located in a common plane and configured as a sliding or rolling means, such as a pin or a wheel.

7. Transporting means according to claim 6, characterized in that the guide means are formed by three wheels, the wheels being arranged in recesses of the basic body, and the running surfaces of two wheels projecting out of one guide side and the running surface of the third wheel projecting out of the opposite guide side.

8. Transporting means according to claim 7, characterized in that the centers of rotation of the three wheels form an isosceles triangle, in that the running surfaces of the two wheels which project on one guide side project beyond in each case one end side, the basic body has a recess into which the wheel of an adjacent transporting means that projects beyond the end side is positioned.

9. Transporting means according to claim 8, characterized in that the wheels are arranged in the basic body such that, and the recesses which are intended for the end-side-projecting wheel of an adjacent transporting means are arranged such that, two transporting means which are located one beside the other in relation to the conveying direction F and are arranged in a state in which they have been rotated through 180 degrees in relation to one another have end sides which are in contact with one another, in order to form an abutting row of individual transporting means.

* * * * *